(12) United States Patent
Rusing

(10) Patent No.: US 11,313,451 B2
(45) Date of Patent: *Apr. 26, 2022

(54) COMPACT ELECTRIC LINEAR DRIVE FOR A GEAR RACK, IN PARTICULAR A HYDRAULIC VALVE, AND METHOD FOR MOUNTING THE SAME

(71) Applicant: BUCHER HYDRAULICS GMBH, Klettgau (DE)

(72) Inventor: Frank Rusing, Radevormwald (DE)

(73) Assignee: BUCHER HYDRAULICS GMBH, Klettgau (DE)

(*) Notice: Subject to any disclaimer, the term of this patent is extended or adjusted under 35 U.S.C. 154(b) by 111 days.

This patent is subject to a terminal disclaimer.

(21) Appl. No.: 16/805,463

(22) Filed: Feb. 28, 2020

(65) Prior Publication Data

US 2020/0200256 A1 Jun. 25, 2020

Related U.S. Application Data

(63) Continuation of application No. 15/746,172, filed as application No. PCT/EP2016/064205 on Jun. 20, 2016, now Pat. No. 10,612,644.

(30) Foreign Application Priority Data

Jul. 22, 2015 (EP) .................................... 15177847

(51) Int. Cl.
*F16K 31/04* (2006.01)
*F16H 57/023* (2012.01)
(Continued)

(52) U.S. Cl.
CPC ............ *F16H 57/023* (2013.01); *F16H 19/04* (2013.01); *F16H 57/02* (2013.01); *F16H 57/025* (2013.01);
(Continued)

(58) Field of Classification Search
CPC ...... F16K 31/04; F16K 31/041; F16K 31/042; F16K 31/043; F16K 31/046; F16K 31/54;
(Continued)

(56) References Cited

U.S. PATENT DOCUMENTS 3,992,956 A ‡ 11/1976 Fischer
4,759,386 A 7/1988 Grouw, III
(Continued)

FOREIGN PATENT DOCUMENTS

DE 29513701 U1 ‡ 9/1996
DE 29513701 10/1996
(Continued)

*Primary Examiner* — Matthew W Jellett
(74) *Attorney, Agent, or Firm* — BainwoodHuang

(57) ABSTRACT

An electric linear drive for a gear rack including a stepping motor, a holding plate, a motor output gear, and a gearing. The holding plate, the stepping motor, the motor output gear, and the gearing form a drive unit that, together with a basic housing, form an overall housing. The overall housing has an opening for the insertion of the gear rack. Drive electronics are fixed to the holding plate such that electrical connections are present on the outside of the overall housing. The stepping motor has a rotor axis arranged parallel to the holding plate. During assembly, a rack belonging to a device to be driven can be pushed into a lateral opening of the overall housing, and the device to be driven can be connected to the overall housing. The electric linear drive is compact, allowing devices to be driven to be located close to one another.

28 Claims, 7 Drawing Sheets

(51) Int. Cl.
| | |
|---|---|
| *F16K 31/54* | (2006.01) |
| *F16H 57/02* | (2012.01) |
| *F16H 57/025* | (2012.01) |
| *F16H 57/029* | (2012.01) |
| *F16H 57/031* | (2012.01) |
| *F16H 19/04* | (2006.01) |
| *F15B 13/04* | (2006.01) |
| *F15B 13/044* | (2006.01) |

(52) U.S. Cl.
CPC ......... *F16H 57/029* (2013.01); *F16H 57/031* (2013.01); *F16K 31/04* (2013.01); *F16K 31/041* (2013.01); *F16K 31/042* (2013.01); *F16K 31/043* (2013.01); *F16K 31/046* (2013.01); *F16K 31/047* (2013.01); *F16K 31/54* (2013.01); *F15B 13/0402* (2013.01); *F15B 13/0444* (2013.01); *F16H 2057/02034* (2013.01); *F16H 2057/02086* (2013.01)

(58) Field of Classification Search
CPC .. F15B 13/0402; F15B 13/0444; F16H 19/04; F16H 57/02; F16H 57/023; F16H 57/031; F16H 57/029; F16H 57/025; F16H 2057/02086; F16H 2057/02034
See application file for complete search history.

(56) References Cited

U.S. PATENT DOCUMENTS

| | | |
|---|---|---|
| 4,836,497 A | 6/1989 | Beeson |
| 7,591,448 B2 | 9/2009 | Martin et al. |
| 8,118,276 B2 | 2/2012 | Sanders et al. |
| 10,239,508 B2 | 3/2019 | Han et al. |
| 10,612,644 B2 | 4/2020 | Rüsing |
| 2004/0134665 A1 | 7/2004 | Greeb et al. |
| 2008/0121828 A1 ‡ | 5/2008 | Thierry et al. |
| 2008/0121830 A1 ‡ | 5/2008 | Thierry et al. |
| 2018/0087544 A1 | 3/2018 | Magaribuchi et al. |

FOREIGN PATENT DOCUMENTS

| | | | |
|---|---|---|---|
| EP | 3078792 | ‡ | 10/2016 |
| EP | 3078981 | | 5/2020 |

‡ imported from a related application

COMPACT ELECTRIC LINEAR DRIVE FOR A GEAR RACK, IN PARTICULAR A HYDRAULIC VALVE, AND METHOD FOR MOUNTING THE SAME

CROSS-REFERENCE TO RELATED APPLICATIONS

This application is a continuation of U.S. patent application Ser. No. 15/746,172 filed Jan. 19, 2018 entitled COMPACT ELECTRIC LINEAR DRIVE FOR A GEAR RACK, IN PARTICULAR A HYDRAULIC VALVE, AND METHOD FOR MOUNTING THE SAME, which claims benefit of the priority of International Patent Application No. PCT/EP2016/064205 filed Jun. 20, 2016 entitled COMPACT ELECTRIC LINEAR DRIVE FOR A GEAR RACK, IN PARTICULAR A HYDRAULIC VALVE, AND METHOD FOR MOUNTING THE SAME.

BACKGROUND

The present disclosure relates to an electric linear drive for a gear rack of a device to be driven. A typical example of such a driving task is described in U.S. Patent Publication No. 2008/0121830A1. There, a plurality of hydraulic valves that are close together are to be actuated by means of gear racks, for which purpose there are corresponding flat, disc-shaped drives, each respectively having a flat stepping motor.

SUMMARY

The present disclosure proceeds from this prior art. An object is to create a compact drive that is suitable for the task described in U.S. Patent Publication No. 2008/0121830A1, but also for other tasks. In particular, individualization for only one driving task is to be avoided, such that different devices can be driven. Moreover, it is intended to create a simply constructed, robust and easily mounted electric linear drive that can easily be connected as a unit to a device to be driven and to an electrical supply and control system.

In certain embodiments, a method is provided for assembling an electric linear drive unit for a gear rack of a device to be driven. The method includes fastening a stepping motor to a flat holding plate. The stepping motor has a rotor axle disposed parallel to the flat holding plate and perpendicular to the gear rack. The method further includes attaching a gearing to the flat holding plate. The gearing is engaged with a motor output gear wheel fastened to the rotor axle. The stepping motor, the gearing, and the flat holding plate form a drive unit. The method further includes assembling the flat holding plate with a basic housing to form an overall housing for the drive unit. The stepping motor and the gearing are disposed within a volume defined by the basic housing. The overall housing has an opening to receive the gear rack for engagement with the gearing.

In certain embodiments, an electric linear drive unit is provided for a gear rack of a device to be driven. The electric linear drive unit includes a flat holding plate and a stepping motor fastened to the flat holding plate. The stepping motor includes a rotor axle and a motor output gear wheel fastened to the rotor axle. The rotor axle is positioned parallel to the flat holding plate and perpendicular to the gear rack. The electric linear drive unit further includes a gearing attached to the flat holding plate. The gearing is engaged with the motor output gear wheel. The stepping motor, the gearing, and the flat holding plate form a drive unit. The electric linear drive unit further includes a basic housing. The stepping motor and the gearing are disposed within a volume defined by the basic housing. The flat holding plate is assembled with the basic housing to form an overall housing, which has an opening to receive the gear rack for engagement with the gearing.

In certain embodiments, a method is provided for operating an electric linear drive unit for a gear rack of a device to be driven. The method includes providing the electric linear drive unit, which includes a flat holding plate, a stepping motor fastened to the flat holding plate, a gearing attached to the flat holding plate, and a basic housing. The stepping motor includes a rotor axle positioned parallel to the flat holding plate and perpendicular to the gear rack. The stepping motor, the gearing, and the flat holding plate form a drive unit. The flat holding plate is assembled with the basic housing to form an overall housing. The method further includes inserting the gear rack through an opening of the overall housing for engagement with the gearing, and connecting the device to be driven to the overall housing.

In accordance with the present disclosure, a linear drive is produced that is easily preassembled and that only after having been assembled can be connected to a device to be driven. Therein, the holding plate simultaneously forms a fastening structure for various components and for a part of the overall housing, as a result of which the number of components and the assembling are simplified. This concept allows a gear rack to be driven subsequently to be guided or carried only in the device to be driven, such that it can be inserted freely into the overall housing. It is, however, also possible to provide a counter-bearing for the gear rack in the overall housing.

In certain arrangements, there are additionally drive electronics fastened to the holding plate, in particular integrated into the latter, specifically such that electrical connections are arranged on the outside of the overall housing. The electrical connections serve to supply voltage and to connect to a control system, the communication with the control system being realized by means of a bus system. In this embodiment, the overall housing thus also contains the electronics required for the operation of the stepping motor, including, if appropriate, monitoring and safety functions.

In certain arrangements, the stepping motor has a rotor axle that is arranged parallel to the holding plate and perpendicularly to the gear rack to be driven. This arrangement differs from the known prior art of very flat linear drives in that the rotor axle does not lie in the direction of the least extent of the overall housing, but perpendicularly thereto. In the case of flat linear drives, such an arrangement was not really considered, because it was believed that the torques required for many applications could not be applied by stepping motors having small diameters. Unexpectedly, however, a torque that is adequate for most applications, and at the same time a high positioning accuracy, can be generated even with a stepping motor having a small diameter, and for this a greater axial length in combination with a gearing. Moreover, in the plane of the holding plate, additional free space is also created in which, besides a gearing, drive electronics can also be fully accommodated.

In certain arrangements, the linear drive according to the present disclosure has a gearing having at least one gear shaft and having two gear wheels as well as a bearing arrangement in the form of a counter-bearing plate. The gear axle in this case may be arranged in a direction parallel to the rotor axle of the stepping motor, one of the gear wheels of the gearing meshing with the motor output gear wheel, while another can be brought into engagement with a gear rack, to be inserted subsequently, of a device to be driven. As far as the spatial conditions allow, the transmission ratio of the gearing may be adapted to the desired application.

In certain arrangements, the basic housing is configured in the shape of a barrel, and has a joint, having a joint sealing, extending substantially in one plane to the drive unit configured in the form of a cover to the barrel-shaped basic housing. In the case of typical housings for linear drives, the components are mounted in a barrel-shaped housing, and it is also often even the case that the device to be driven must be mounted before the housing can be closed with the cover. According to the present disclosure, the basic housing forms an empty volume into which components, fastened to the holding plate, can be inserted when the holding plate, which simultaneously forms, as it were, the cover for the basic housing, is put on. This structure has various advantages in mounting and in the number of parts and steps that are required. Moreover, a joint that extends substantially in one plane can thus be formed with a level sealing, while an opening in the basic housing that is entirely independent of this joint can be provided for the subsequent connection of a device to be driven, having its own sealing, if appropriate.

In certain arrangements, the barrel-shaped basic housing has a lateral opening for inserting the gear rack of a device to be driven, and a centering means for centering the linear drive in relation to the gear rack or the device to be driven by the gear rack. This structure allows the linear drive according to the present disclosure to be assembled in a rapid and exact manner with a device to be driven. This feature is advantageous, in particular, in the case of application for driving hydraulic valves arranged closely together, since in the case of such an arrangement individual linear drives can be exchanged without removing the adjacent drives, in that they are easily drawn from the gear rack in the direction of the gear rack.

If necessary, the gear rack may also be pressed by a counter-bearing against the final gear wheel of the transmission, this being advantageous, in particular, if the gear rack has at least one joint on the input side. Such an arrangement with a jointed gear rack is more easily mounted, and allows certain deviations in the mutual alignment of a linear drive and a device to be driven.

The fastening between the linear drive and a device to be driven is effected by a flange, having a flange seal, on the basic housing, the gear rack being inserted into the inside of the overall housing and being brought into engagement with the final gear wheel of the gearing, but not necessarily mounted in the overall housing.

The structure of the linear drive according to the present disclosure renders possible very compact dimensions, wherein the overall housing may be of a flat configuration having a height to length to width ratio of approximately 50:130:130, having absolute dimensions of less than 50 millimeters (mm) in height, less than 130 mm in length, and less than 130 mm in width. The overall housing therefore has an almost square shape in one plane and, perpendicularly thereto, a relatively small height, this facilitating the slice-type arrangement for driving a plurality of devices arranged next to each other.

As already mentioned above, a stepping motor is used, having an external stator that has a greatest diameter of less than 45 mm and that is arranged in a decentralized manner on the holding plate, such that drive electronics can still be arranged next to it. This makes particularly good use of the space available in the case of typical dimensions for linear drives of this type.

The present disclosure also relates to a method for mounting a linear drive, in particular a linear drive as described above. The method comprises the following steps:

a stepping motor having a motor output gear wheel is fastened to a holding plate, a gearing is fastened to the stepping motor and the holding plate, and a drive unit being produced thus is assembled with a basic housing to form an overall housing, such that the stepping motor and the gearing are located in the overall housing.

Only a few steps are required in this type of assembling, because the holding plate not only carries individual components, but at the same time forms a part of the overall housing.

The concept of the present disclosure is particularly advantageous if, prior to the assembling of the overall housing, drive electronics are also fastened to the holding plate or integrated into the latter, such that, following the assembling, electrical connections lie on the outside of the overall housing. There is thus produced, with few mounting steps, a finished compact linear drive, including its drive electronics, which only has to be subsequently connected to a device to be driven, and to a voltage supply and a control device. This happens following the assembling of the overall housing, in that a gear rack belonging to the device to be driven is pushed into a lateral opening of the overall housing, and the device to be driven is connected to the overall housing. A suitable centering means and, if appropriate, a flange sealing, ensure a correct and stable connection.

The present disclosure offers particular advantages if a plurality of linear drives are connected in succession to devices to be driven, in particular hydraulic valves that are located adjacently, or even close, to each other, such that the linear drives are positioned next to each other in a slice-type manner.

Further details and exemplary embodiments of the present disclosure are explained in greater detail on the basis of the drawings, the components described singly or in particular combinations also being able to be used in other technically appropriate combinations.

BRIEF DESCRIPTION OF THE DRAWINGS

The foregoing and other objects, features and advantages will be apparent from the following description of particular embodiments of the present disclosure, as illustrated in the accompanying drawings, in which like reference characters refer to the same parts throughout the different views.

DETAILED DESCRIPTION

The disclosure of U.S. patent application Ser. No. 15/746,172 filed Jan. 19, 2018 entitled COMPACT ELECTRIC LINEAR DRIVE FOR A GEAR RACK, IN PARTICULAR A HYDRAULIC VALVE, AND METHOD FOR MOUNTING THE SAME is hereby incorporated herein by reference in its entirety.

Figure 1:
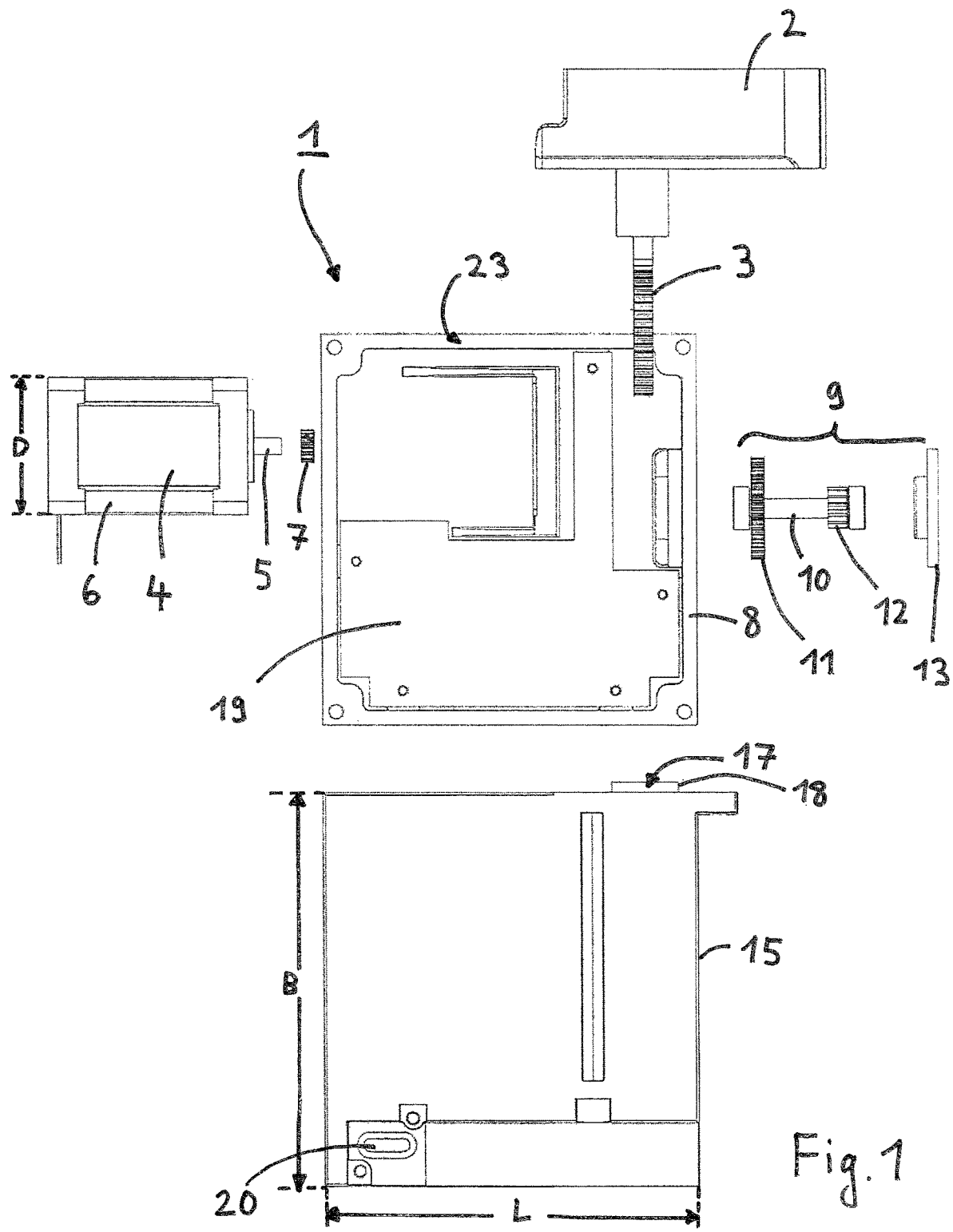
FIG. 1 shows a schematic exploded diagram of the components of an exemplary embodiment of a linear drive according to the present disclosure, prior to assembling.

FIG. 1, in the form of an exploded diagram, shows the essential parts of the linear drive 1 according to the present disclosure for a gear rack 3 and its action in combination with a device 2 to be driven, from which the gear rack 3 projects. The designations of the individual parts are retained in all figures. A stepping motor 4 having a stator 6, a rotor axle 5 and a motor output gear wheel 7, to be fastened thereto, can be fastened to a holding plate 8. Likewise, a gearing 9, which has a gear shaft 1 having a first gear wheel 11 and a second gear wheel 12 fastened thereto, can be attached to the holding plate 8. The gear shaft is mounted between the stepping motor 4 and a counter-bearing plate 13. Drive electronics 19 are additionally attached to the holding plate 8 or even integrated into the holding plate 8 (the holding plate 8 and the drive electronics 19 form a mechanical unit), specifically such that subsequently electrical connections 20 are arranged on the outside of an overall housing 16 that is produced following the assembling of the holding plate 8 and a basic housing 15. As far as the connections 20 are arranged on the outside of the basic housing 15, a suitable connection, not represented separately here, must be made between the drive electronics 19 and connections 20, this being achievable by usual techniques such as cables with plug-in connections, soldered connections and the like, prior to assembling. Clearly, in the case of data lines, a connection that can be operated with as little interference as possible should be provided.

The holding plate 8, together with the stepping motor 4, the gearing 9 and the drive electronics 19, forms a very compact drive unit 14, which can be inserted into the barrel-shaped basic housing 15, the holding plate 8 forming a kind of flat cover that realizes a level joint 23 with the basic housing 15. During assembling, a joint sealing 24, not represented, can be introduced into this level joint 23, for the purpose of tightly sealing the overall housing 16, composed of the basic housing 15 and the holding plate 8. The basic housing 15 has a lateral opening 17, through which the gear rack 3 of the device 2 to be driven is inserted into the inside of the overall housing 16 and there brought into engagement with the second gear wheel 12 of the gearing 9. A centering device 18 on the basic housing 15, together with a corresponding counter-piece on the device 2 to be driven, ensures exact positioning of the gear rack 3 which, in the present exemplary embodiment, is not carried or guided in the overall housing 16, but only in the device 2 to be driven. It is, however, also possible to provide, in the overall housing 16, a counter-bearing on the side of the gear rack 3 that is opposite the second gear wheel 12.

Figure 2:
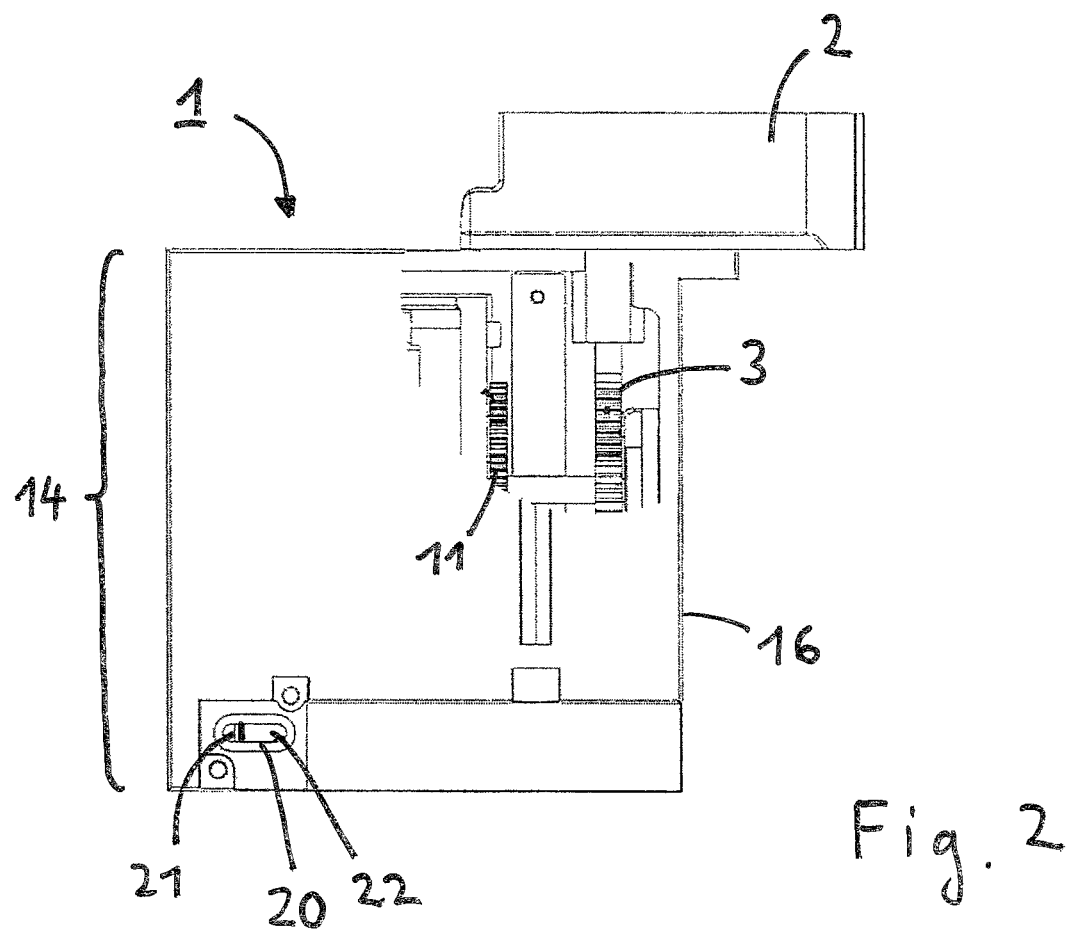
FIG. 2 shows a partially sectional view from above of a linear drive according to the present disclosure, with a device to be driven.

FIG. 2, in a partially sectional and schematic view, shows the action of the drive unit 14 of the linear drive 1 according to the present disclosure in combination with the device 2 to be driven, in an assembled state. The electrical connections 20 attached to the outside of the overall housing 16 only have to have a voltage supply 21 and a connection 22 for a bus system for controlling the drive electronics 19 arranged in the overall housing 16.

Figure 3:
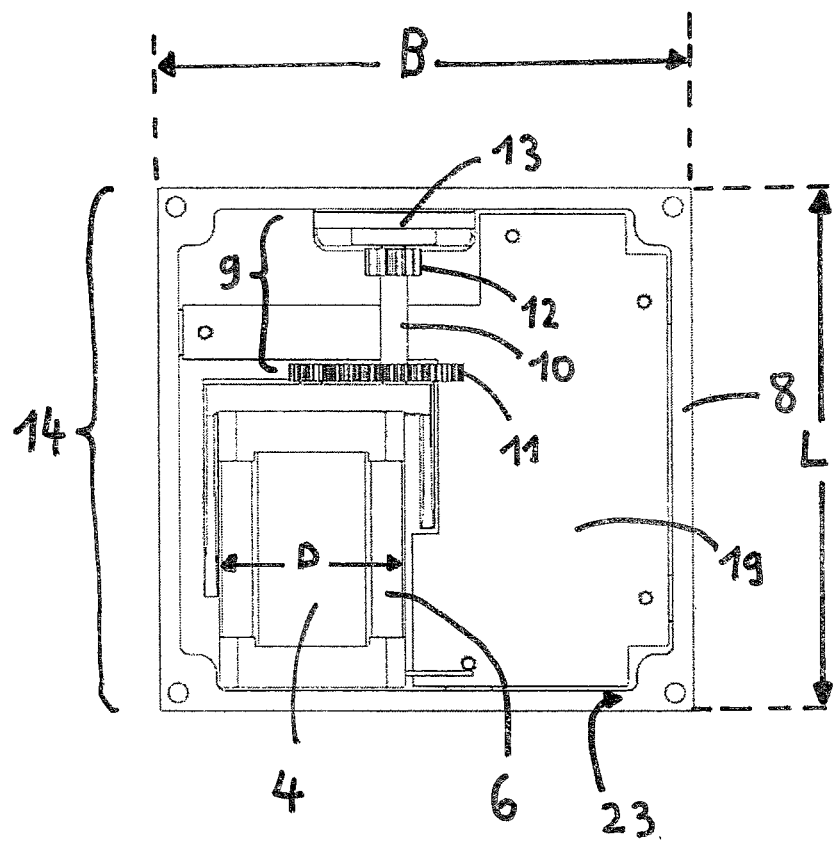
FIG. 3 shows a cross section through the arrangement according to FIG. 1 inside the overall housing, with a view of the components arranged therein.

FIG. 3 again illustrates the structure and the size ratios of the drive unit 14 in the assembled state. It can be seen that, following the installation of the stepping motor 4, the stator 6 of which has an external diameter D (or, in the case of, for instance, a square cross section, a corresponding cross-sectional width) that is significantly less than the width B or the length L of the approximately square holding plate 8, next to the stepping motor 4 and the gearing 9 sufficient space still remains for the drive electronics 19. The axial length of the stator is approximately twice as great as its diameter, or cross-sectional width. As absolute dimensions in the exemplary embodiment shown, there is a cross-sectional width of, for instance, 26 mm and a stator length of, for instance, 55 mm.

Figure 4:
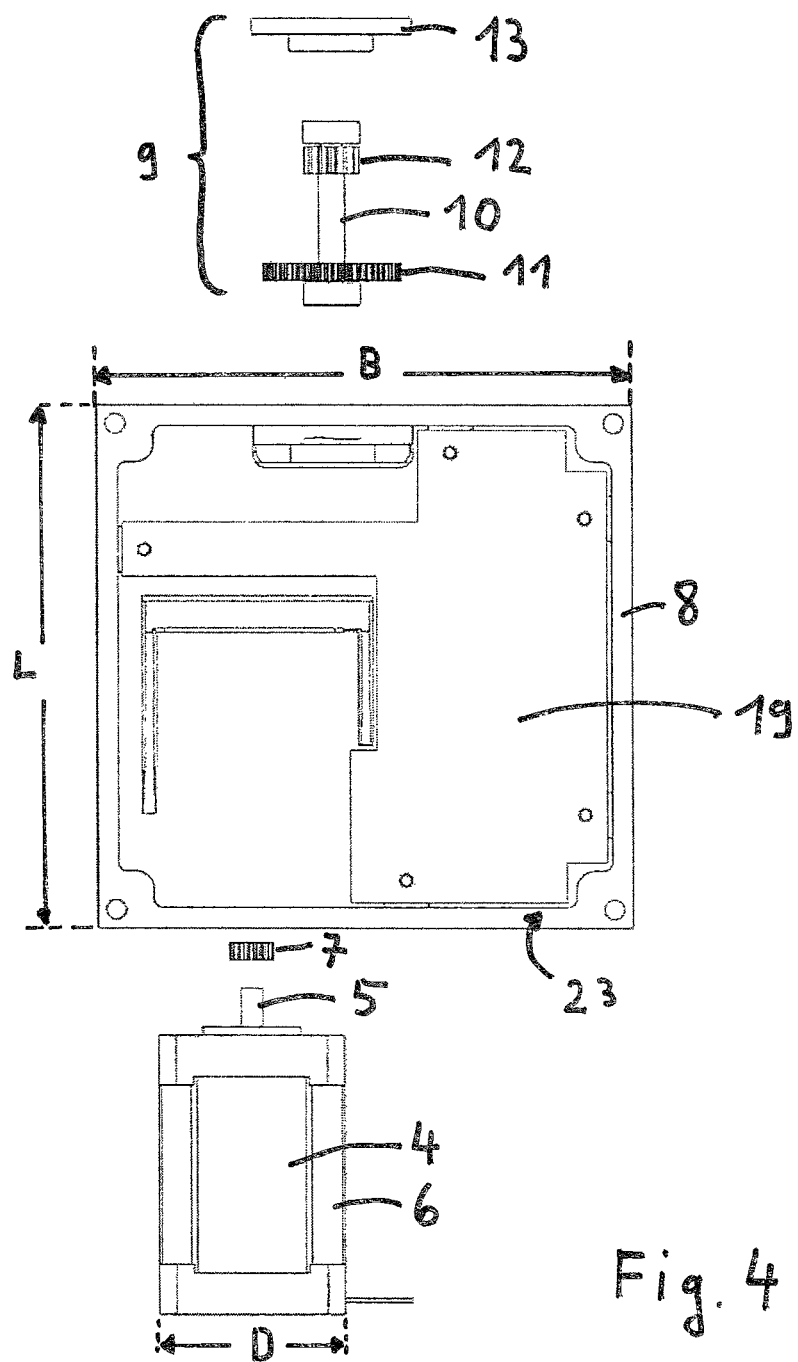
FIG. 4 shows mechanical components of a drive unit, in a schematic view, prior to assembling.

FIG. 4, like FIG. 1, shows the parts that belong to a drive unit according to the present disclosure.

Figure 5:
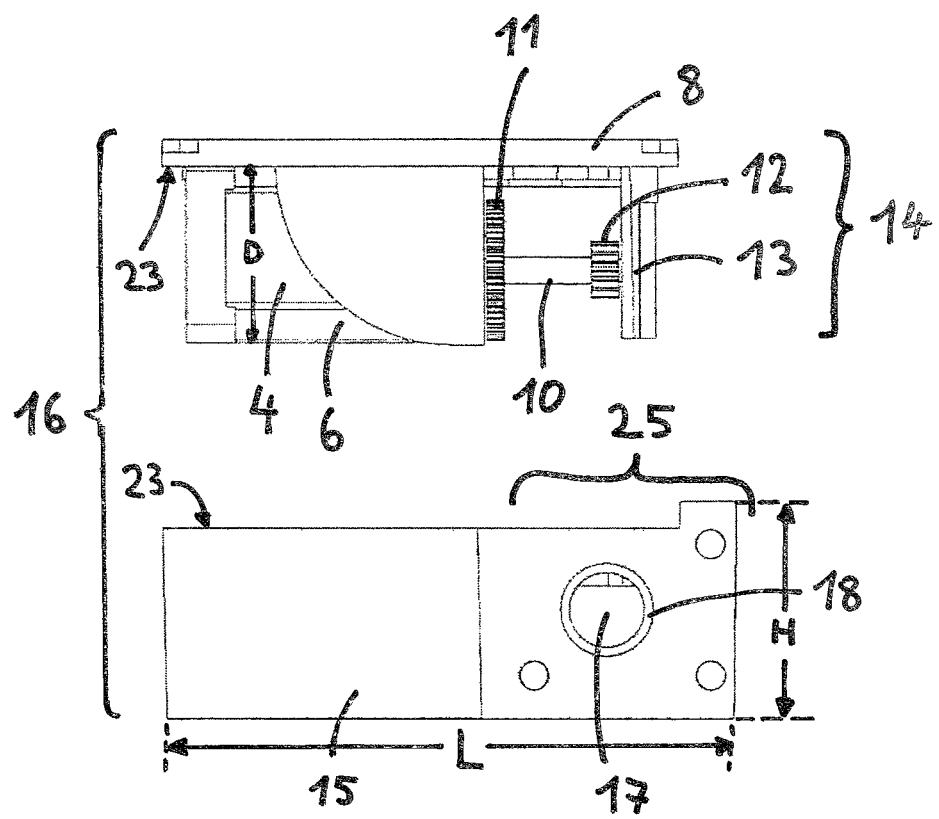
FIG. 5 shows a lateral view of the basic housing and mounted drive unit, prior to them being assembled.

FIG. 5 shows a lateral view of the relatively flat structural form of the entire linear drive 1 not yet illustrated in the preceding figures. It can be seen here that the basic housing 15 is in the shape of a barrel, and has a height H. The drive unit 14 which, as it were, is suspended on the holding plate 8, can be inserted into the barrel-shaped basic housing 15 from above, such that an overall housing 16 is produced and a level joint 23 is formed between the two housing parts 8, 15. The diameter D of the stator 6 of the stepping motor 4 is less than the height H of the overall housing 16 but, owing to a relatively long axial length, the stepping motor 4 in combination with the gearing 9, can nevertheless apply the toques required of such a linear drive 1. FIG. 5 also illustrates the difference in relation to other concepts in the prior art, in which stepping motors are fitted into flat housings. In the case of the present disclosure, the rotor axle 5 of the stepping motor 4 does not lie in the direction of least extent, namely the height H of the overall housing 16, but perpendicularly thereto. Moreover, the motor is not first fitted into a barrel-shaped housing and brought into engagement with a gear rack before the whole is closed by a cover. In the case of the present disclosure, a gear rack 3 can be inserted through a lateral opening 17 after the overall housing 16 has been closed. The gear rack 3 is brought into a correct position by a centering means 18. A flange 25 on the overall housing 16 allows the fastening of a device 2 to be driven.

Figure 6:
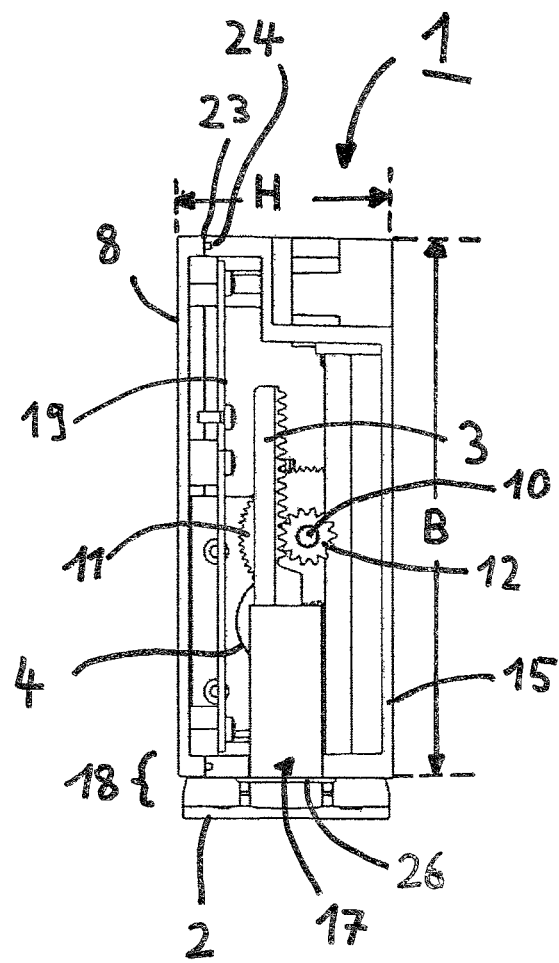
FIG. 6 shows a finished, mounted drive unit, in a schematic, lateral, partially sectional view.

FIG. 6 likewise shows in a lateral, partially sectional view, but from a different direction from that of FIG. 5, a linear drive 1 according to the present disclosure in an assembled state and with an indicated flange-mounted device 2 to be driven, such that the gear rack 3 thereof is in engagement with the second gear wheel 12 of the gearing 9. It becomes evident that the lateral arrangement of the stepping motor 4 not only creates space for drive electronics 19 on the holding plate 8, but also a large amount of space for the movement of the gear rack 3, such that a relatively large drive path can be realized. Also evident are the barrel-shaped form of the basic housing 15 and the level joint 23 between the basic housing 15 and the holding plate 8, with an indicated joint sealing 24. The type of the sealing, however, is of secondary importance, and may depend on the ambient and temperature conditions to be dealt with.

Figure 7:
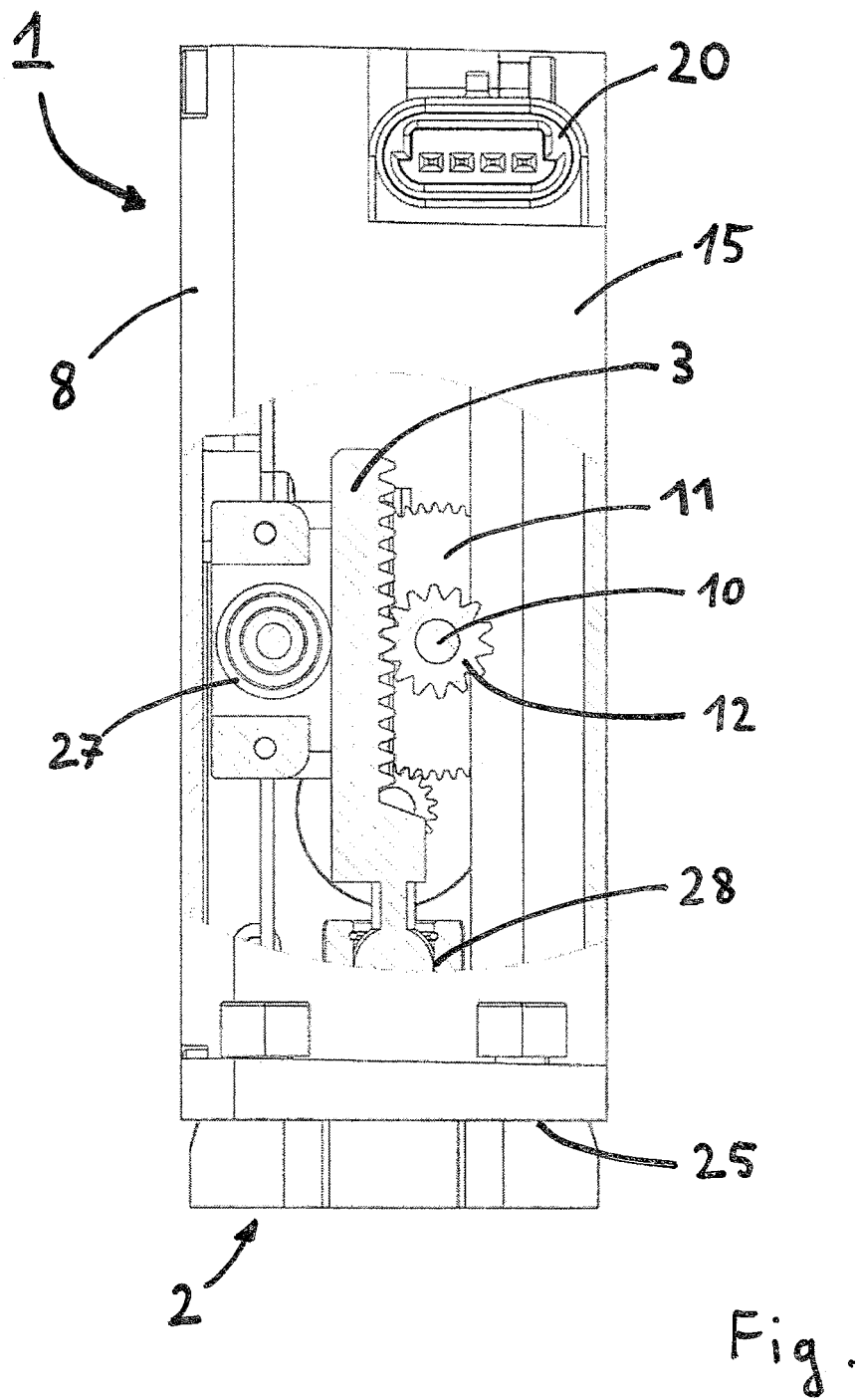
FIG. 7 shows a further exemplary embodiment of a finished, mounted drive unit, in a schematic, partially sectional view, with a gear rack that is guided by a counter-bearing and provided with joint.

FIG. 7, in the same view as in FIG. 6, shows a further exemplary embodiment of the present disclosure, in which the gear rack 3 is provided with a joint 28, such as a ball joint, and guided by a counter-bearing 27 and pressed against the second gear wheel 12 of the gearing 9. This embodiment facilitates the assembling of the linear drive 1 according to the present disclosure with a device 2 to be driven, and allows certain tolerances in the alignment of these two parts, without limiting the precision of the guiding.

The linear drive according to the present disclosure may be very compact, in particular having dimensions of, for example, a height H of approximately 48 mm, and a length L and a width B each of approximately 120 mm. The linear drive according to the present disclosure is consequently particularly suitable for driving hydraulic valves that are disposed next to each other in a row. The drive is easy to exchange, even on an inner hydraulic valve of a row, and in the case of integrated drive electronics the amount of electrical supply leads can be kept small. However, the linear drive according to the present disclosure can also be used without difficulty for driving other devices, insofar as the latter have their own suitable built-in gear rack.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of assembling an electric linear drive unit for a gear rack of a device to be driven, comprising:
   fastening a stepping motor to a holding plate, wherein the stepping motor has a rotor axle;
   attaching a gearing to the holding plate, wherein the gearing is engaged with a motor output gear wheel fastened to the rotor axle, and wherein the electric linear drive unit includes the stepping motor, the rotor axle, the motor output gear wheel, and the gearing; and
   assembling the holding plate with a basic housing to form an overall housing for the electric linear drive unit, wherein the overall housing has an opening configured to receive the gear rack for engagement with the gearing, and wherein the rotor axle is arranged perpendicular to a direction of least extent of the overall housing and perpendicular to the gear rack.

2. The method of claim 1 wherein the electric linear drive unit further includes a counter-bearing plate, wherein the gearing includes a gear shaft, and wherein the attaching of the gearing to the holding plate includes mounting the gear shaft parallel to the rotor axle between the stepping motor and the counter-bearing plate.

3. The method of claim 2 wherein the gear shaft includes a first gear wheel and a second gear wheel, and wherein the method further comprises:
   meshing the first gear wheel with the motor output gear wheel.

4. The method of claim 3 further comprising:
   engaging the second gear wheel with the gear rack.

5. The method of claim 1 wherein the electric linear drive unit further includes drive electronics and electrical connections for the drive electronics, and wherein the method further comprises:
   attaching the drive electronics to the holding plate, wherein the drive electronics are attached to the holding plate such that the electrical connections are arranged on an outside region of the overall housing.

6. The method of claim 1 wherein the assembling of the holding plate with the basic housing includes inserting the electric linear drive unit onto the basic housing.

7. The method of claim 1 wherein, upon the assembling of the holding plate with the basic housing to form the overall housing, a level joint is formed between the holding plate and the basic housing, and wherein the method further comprises:
   introducing a joint sealing into the level joint to seal the overall housing.

8. The method of claim 1 wherein the electric linear drive unit includes a counter-bearing plate and a centering device, and wherein the assembling of the holding plate with the basic housing to form the overall housing includes assembling the holding plate with the basic housing so that the gear rack is positioned within the electric linear drive unit by the centering device and the counter-bearing plate.

9. An electric linear drive unit for a gear rack of a device to be driven, comprising:
   a holding plate;
   a stepping motor fastened to the holding plate, wherein the stepping motor includes a rotor axle and a motor output gear wheel fastened to the rotor axle;
   a gearing attached to the holding plate, wherein the gearing is engaged with the motor output gear wheel, and wherein the electric linear drive unit includes the stepping motor, the rotor axle, the motor output gear wheel, and the gearing; and
   a basic housing,
   wherein the holding plate is assembled with the basic housing to form an overall housing for the electric linear drive unit,
   wherein the overall housing has an opening configured to receive the gear rack for engagement with the gearing, and
   wherein the rotor axle is arranged perpendicular to a direction of least extent of the overall housing and perpendicular to the gear rack.

10. The electric linear drive unit of claim 9 further comprising:
    a counter-bearing plate,
    wherein the gearing includes a gear shaft, and wherein the gear shaft is mounted parallel to the rotor axle between the stepping motor and the counter-bearing plate.

11. The electric linear drive unit of claim 10 further comprising:
    a centering device,
    wherein the gear rack is positioned within the electric linear drive unit by the counter-bearing plate and the centering device.

12. The electric linear drive unit of claim 10 wherein the gear shaft includes a first gear wheel and a second gear wheel, wherein the first gear wheel is meshed with the motor output gear wheel, and wherein the second gear wheel is engaged with the gear rack.

13. The electric linear drive unit of claim 9 further comprising:
    drive electronics; and
    electrical connections for the drive electronics,
    wherein the drive electronics are attached to the holding plate, and
    wherein the electrical connections are arranged on an outside region of the overall housing.

14. The electric linear drive unit of claim 13 wherein the stepping motor includes a stator having a greatest diameter or cross-sectional width of less than 45 millimeters.

15. The electric linear drive unit of claim 14 wherein the stepping motor is arranged in a decentralized manner on the holding plate.

16. The electric linear drive unit of claim 15 wherein the drive electronics are arranged next to the stepping motor on the holding plate.

17. A method of operating an electric linear drive unit for a gear rack of a device to be driven, comprising:
providing the electric linear drive unit including a stepping motor fastened to a holding plate, a gearing attached to the holding plate, and a basic housing, wherein the stepping motor includes a rotor axle and a motor output gear wheel, wherein the electric linear drive unit includes the stepping motor, the rotor axle, the motor output gear wheel, and the gearing, wherein the holding plate is assembled with the basic housing to form an overall housing for the electric linear drive unit, and wherein the rotor axle is arranged perpendicular to a direction of least extent of the overall housing;
inserting the gear rack through an opening of the overall housing for engagement with the gearing, wherein the rotor axle is further arranged perpendicular to the gear rack; and
connecting the device to be driven to the overall housing.

18. The method of claim 17 wherein the device to be driven is a hydraulic valve device, and wherein the method further comprises:
following the engagement of the gear rack with the gearing, driving the hydraulic valve device with the electric linear drive unit.

19. The method of claim 17 wherein the basic housing includes a flange seal, and wherein the connecting of the device to be driven to the overall housing includes connecting the device to be driven to the overall housing by the flange seal.

20. The method of claim 17 wherein the electric linear drive unit is one of a plurality of similarly configured electric linear drive units, wherein each of the plurality of similarly configured electric linear drive units includes a holding plate, wherein each of the plurality of similarly configured electric linear drive units has a reduced height in the direction of least extent of the overall housing, and wherein the method further comprises:
positioning the plurality of similarly configured electric linear drive units adjacent to one another in a slice-type manner.

21. The method of claim 1 wherein the rotor axle is further arranged parallel to the holding plate.

22. The electric linear drive unit of claim 9 wherein the rotor axle is further arranged parallel to the holding plate.

23. The method of claim 17 wherein the rotor axle is further arranged parallel to the holding plate.

24. An electric linear drive unit for a gear rack of a hydraulic valve, comprising:
a stepping motor, wherein the stepping motor has a rotor axle and a motor output gear wheel;
a gearing with at least one gear shaft having a gear axle, a first gear wheel, a second gear wheel, and a bearing arrangement;
a holding plate; and
a basic housing,
wherein the stepping motor, the rotor axle, the motor output gear wheel, and the gearing are configured and arranged to form the electric linear drive unit;
wherein the holding plate and the basic housing are configured and arranged to form an overall housing for the electric linear drive unit,
wherein the overall housing has an opening configured to receive the gear rack,
wherein the gear axle of the gear shaft is arranged in a direction parallel to the rotor axle,
wherein the rotor axle is arranged perpendicularly to a direction of lowest extent of the overall housing and perpendicularly to the gear rack,
wherein the first gear wheel is configured to mesh with the motor output gear wheel, and
wherein the second gear wheel is configured to engage with the gear rack.

25. An electric linear drive unit for a gear rack of a device to be driven, comprising:
a stepping motor including a rotor axle having a motor output gear wheel;
a gearing component configured to engage the motor output gear wheel;
a holding plate; and
a basic housing,
wherein at least the stepping motor, the rotor axle, the motor output gear wheel, and the gearing component form the electric linear drive unit,
wherein the holding plate and the basic housing are configured and arranged to form an overall housing for the electric linear drive unit;
wherein the overall housing has an opening configured to receive the gear rack for engagement with the gearing component; and
wherein the rotor axle is arranged perpendicular to a direction of least extent of the overall housing and perpendicular to the gear rack.

26. The electric linear drive unit of claim 25 wherein a dimension in the direction of least extent is less than about 50 millimeters (mm).

27. The electric linear drive unit of claim 25 wherein the stepping motor further includes a stator having a diameter less than about 45 millimeters (mm).

28. The electric linear drive unit of claim 25 wherein the electric linear drive unit is configured to be positioned adjacent to one or more similarly configured electric linear drive units in a slice-type manner.

* * * * *